(12) United States Patent
Pathak et al.

(10) Patent No.: US 11,514,028 B2
(45) Date of Patent: Nov. 29, 2022

(54) HYBRID DATA STORAGE AND LOAD SYSTEM WITH ROWID LOOKUP

(71) Applicant: SAP SE, Walldorf (DE)

(72) Inventors: Amit Pathak, Pune (IN); Colin Florendo, Marlborough, MA (US); Pushkar Khadilkar, Pune (IN); Robert Schulze, Walldorf (DE)

(73) Assignee: SAP SE, Walldorf (DE)

( * ) Notice: Subject to any disclaimer, the term of this patent is extended or adjusted under 35 U.S.C. 154(b) by 302 days.

(21) Appl. No.: 16/863,834

(22) Filed: Apr. 30, 2020

(65) Prior Publication Data
US 2020/0387495 A1  Dec. 10, 2020

Related U.S. Application Data

(60) Provisional application No. 62/858,693, filed on Jun. 7, 2019.

(51) Int. Cl.
*G06F 16/00* (2019.01)
*G06F 16/23* (2019.01)
(Continued)

(52) U.S. Cl.
CPC ........ *G06F 16/2379* (2019.01); *G06F 3/0604* (2013.01); *G06F 3/064* (2013.01);
(Continued)

(58) Field of Classification Search
CPC .. G06F 16/22; G06F 12/0817; G06F 12/0888; G06F 16/2228; G06F 16/2246; G06F 16/245; G06F 16/284; G06F 16/9017; G06F 3/0611; G06F 3/0635; G06F 3/0674

See application file for complete search history.

(56) References Cited

U.S. PATENT DOCUMENTS 6,191,710 B1   2/2001 Waletzki
9,817,858 B2  11/2017 Eisenreich et al.
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.
(Continued)

*Primary Examiner* — Yicun Wu
(74) *Attorney, Agent, or Firm* — Sterne, Kessler, Goldstein & Fox P.L.L.C.

(57) ABSTRACT

System, method, and various embodiments for providing a hybrid data storage and load system are described herein. An embodiment operates by receiving a lookup request comprising a row identifier (ROWID) corresponding to a row of a table of a database. Which of a first set of pages corresponds to a sorted position of the ROWID is identified. The identified page of the first set of pages is loaded from the disk storage to the memory storage. A sorted row position of the ROWID is identified from a memory block of the loaded page from the first set of pages. One of a second set of pages that includes the sorted row position is identified. The identified one of the second set of pages is loaded from the disk storage into memory. The loaded identified one of the second set of pages is searched for the unsorted position of the ROWID.

20 Claims, 6 Drawing Sheets

(51) Int. Cl.
G06F 12/02 (2006.01)
G06F 3/06 (2006.01)
G06F 16/22 (2019.01)
G06F 12/0882 (2016.01)
G06F 16/2455 (2019.01)
G06F 12/0875 (2016.01)
G06F 9/48 (2006.01)

(52) U.S. Cl.
CPC .......... G06F 3/0673 (2013.01); G06F 9/4843 (2013.01); G06F 12/0223 (2013.01); G06F 12/0246 (2013.01); G06F 12/0875 (2013.01); G06F 12/0882 (2013.01); G06F 16/221 (2019.01); G06F 16/2219 (2019.01); G06F 16/2228 (2019.01); G06F 16/2237 (2019.01); G06F 16/2255 (2019.01); G06F 16/2272 (2019.01); G06F 16/2282 (2019.01); G06F 16/24552 (2019.01); G06F 16/24558 (2019.01); G06F 2212/1024 (2013.01); G06F 2212/1044 (2013.01)

(56) References Cited

U.S. PATENT DOCUMENTS

| | | |
|---|---|---|
| 9,852,169 B2 | 12/2017 | Faerber et al. |
| 2014/0281212 A1 | 9/2014 | Schreter et al. |
| 2016/0012089 A1 | 1/2016 | Sherkat et al. |
| 2016/0147457 A1 | 5/2016 | Legler et al. |
| 2016/0147904 A1 | 5/2016 | Wein |
| 2017/0322960 A1 | 11/2017 | Glebe et al. |

OTHER PUBLICATIONS

Aken, D.V. et al., "Automatic Database Management System Tuning Through Large-scale Machine Learning," ACM SIGMOD '17, May 14-19, 2017, pp. 1009-1024.
Alexiou, K. et al. "Adaptive Range Filters for Cold Data: Avoiding Trips to Siberia," Proc. of the VLDB Endowment, vol. 6, No. 14, 2013, pp. 1714-1725.
Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.
Andrei, M. et al., "SAP HANA Adoption of Non-Volatile Memory," Proc. of the VLDB Endowment, vol. 10, No. 12, 2017, pp. 1754-1765.
Anh, V.N. and Moffat, A., "Index compression using 64-bit words," Software—Practice and Experience, vol. 40, 2010, pp. 131-147.
Arulraj, J. et al., "Multi-Tier Buffer Management and Storage System Design for Non-Volatile Memory," arXiv:1901.10938v1 [cs.DB], Jan. 30, 2019, 17 pages.
Belazzougui, D. et al., "Hash, displace, and compress," Algorithms—ESA 2009, Proc. 17th Annual European Symposium, Copenhagen, Denmark, Sep. 7-9, 2009, pp. 682-603.
Bhattacharjee, B. et al., "Efficient Index Compression in DB2 LUW," VLDB '09, vol. 2, No. 2, 2009, pp. 1462-1473.
Do, J. et al., "Turbocharging DBMS Buffer Pool Using SSDs," ACM SIGMOD, 2011, pp. 1113-1124.
Eldawy, A. et al., "Spatial Partitioning Techniques in SpatialHadoop," Proc. of the VLDB Endowment, vol. 8, No. 12, 2015, pp. 1602-1605.
Elghandour, I. et al., "An XML Index Advisor for DB2," ACM SIGMOD'08, Jun. 9-12, 2008, 4 pages.
Finkelstein, S. et al., "Physical Database Design for Relational Databases," ACAI Trans. on Database Systems, vol. 13, No. 1, Mar. 1988, pp. 91-128.
Graefe, G. et al., "In-memory Performance for Big Data," Proc. of the VLDB Endowment, vol. 8, No. 1, 2014, pp. 37-48.
Graefe, G., "Volcano—An Extensible and Parallel Query Evaluation System," IEEE Trans. on Knowledge and Data Engineering, vol. 6, No. 1, Feb. 1994, pp. 120-135.
Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.
Lang, H. et al., Data Blocks: Hybrid OLTP and OLAP on Compressed Storage using both Vectorization and Compilation. ACM SIGMOD, 2016, pp. 311-326.
Larson, P. et al., "Real-Time Analytical Processing with SQL Server," Proc. of the VLDB Endowment, vol. 8, No. 12, Aug. 31-Sep. 4, 2015. pp. 1740-1751.
Lee, J. et al., "Hybrid Garbage Collection for Alulti-Version Concurrency Control in SAP HANA," ACM SIGMOD, Jun. 26-Jul. 1, 2016, pp. 1307-1318.
Leis, V. et al., "LeanStore: In-Memory Data Management Beyond Main Memory," IEEE ICDE, 2018, pp. 185-196.
Lemke, C. et al., "Speeding Up Queries in Column Stores—A Case for Compression," DAWAK, 2010, pp. 117-129.
Liu, X. and Salem, K., "Hybrid Storage Management for Database Systems," Proc. of the VLDB Endowment, vol. 6, No. 8, Aug. 26-30, 2013, pp. 541-552.
Majewski, B.S. et al., "A Family of Perfect Hashing Methods," The Computer Journal, vol. 39, No. 6., 1996, pp. 547-554.
May, N. et al., "SAP HANA—The Evolution of an In-Memory DBMS from Pure OLAP Processing Towards Mixed Workloads," BTW, 2017, pp. 545-563.
Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.
Müller, I, et al., "Adaptive String Dictionary Compression in In-Memory Column-Store Database Systems," Open Proceedings, 10.5441/002/edbt.2014.27, 2014, pp. 283-294.
Müller, I. et al., "Retrieval and Perfect Hashing Using Fingerprinting." J. Gudmundsson and J. Katajainen (Eds.), SEA 2014: Experimental Algorithms, Springer International Publishing, 2014, pp. 138-149.
Nehme, R. and Bruno, N., "Automated Partitioning Design in Parallel Database Systems," In ACM SIGMOD, 2011, pp. 1137-1148.
Neumann, T., Efficiently Compiling Efficient Query Plans for Modern Hardware, Proc. of the VLDB Endowment, vol. 4, No. 9, 2011, pp. 539-550.
Nica, A. et al., "Statisticum: Data Statistics Management in SAP HANA," Proc. of the VLDB Endowment, vol. 10, No. 12, 2017, pp. 658-1669.
On, S.T. et al., "FD-Buffer: A Buffer Manager for Databases on Flash Disks," ACM CIKM '10, Oct. 25-29, 2010, pp. 1297-1300.
Oracle® Database—Database In-Memory Guide, 19c, E96137-03, downloaded from https://docs.oracle.com/en/database/oracle/oracle-database/19/inmem/, Copyright 2016, 2020, 255 pages.
Pathak, A. et al., "Adaptive storage and access for simplified data management," *DaMoN '19*, Jul. 1, 2019, 6 pages.
Plaisance, J. et al., "Vectorized VByte Decoding," 1$^{st}$ Int'l Symp. on Web AlGorithms, Jun. 2015, 7 pages.
Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.
Poess, M. and Potapov, D., "Data Compression in Oracle," Proc. of the VLDB Conference, 2003, pp. 937-947.
Sacco, G.M. and Schkolnick, M., "A Mechanism For Managing The Buffer Pool In A Relational Database System Using Tire Hot Set Model," Proc. of the Eighth Int'l. Conf. on Very Large Data Bases, Sep. 1982, pp. 257-262.
Sherkat, R. et al., "Page As You Go: Piecewise Columnar Access In SAP HANA," ACM SIGMOD '16, Jun. 26-Jul. 1, 2016, pp. 1295-1306.
Stoica, R. and Ailamaki, A., Enabling Efficient OS Paging for Main-Memory OLTP Databases. ACM DaMoN '13. 2013, 7 pages, 2013.

(56) References Cited

OTHER PUBLICATIONS

Willhalm, T. et al., "Vectorizing Database Column Scans with Complex Predicates," ADMS 2013, pp. 1-12.
Xie, D. et al., "Simba: Efficient In-Memory Spatial Analytics," ACM SIGMOD '16, Jun. 26-Jul. 1, 2016, pp. 1071-1085.
Zilio, D.C. et al., "DB2 Design Advisor: Integrated Automatic Physical Database Design," Procs. Of the $30^{th}$ VLDB Conference, 2004, pp. 1087-1097.
Pathak, A. et al., U.S. Appl. No. 16/863,860, filed Apr. 30, 2020, entitled "Hybrid Data Storage and Load System With Position Lookup".

HYBRID DATA STORAGE AND LOAD SYSTEM WITH ROWID LOOKUP

CROSS-REFERENCE TO RELATED APPLICATION

This application claims priority to provisional patent application No. 62/858,963, titled "Native Store Extension for Combined Workload Databases" to Sherkat et al, filed Jun. 7, 2019, which is herein incorporated by reference in its entirety. This application is related to U.S. patent application Ser. No. 16/863,860 titled "Hybrid Data Storage and Load System With Position Lookup," filed herewith, which is herein incorporated by reference in its entirety.

BACKGROUND

When a query on a database is received, for the query to be processed, the data that needs to be searched based on the query first needs to be loaded into memory. In a column-oriented database, a query on a particular column of data may only require a small subsection of data to be searched or accessed relative to the large amount of data available in the column. In such situations, it is a waste of system resources to load all of the column data into memory, when only a small portion of the data is required for processing the query.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a hybrid data storage and load system.

Disk-based or row-oriented databases may use page-based persistence mechanisms to store and access data. Page-based persistence may enable a single or subset of memory pages to be loaded into memory, rather than all of the data of a particular row. In-memory or column-oriented databases by contrast, may perform complete data loads into memory, in which all of the column data of a particular column is loaded into memory.

While paged-based loading may provide for better memory utilization by loading smaller portions of relevant or accessed data (e.g., loading in smaller units of memory or data pages), loading full column data (e.g., which can extend across multiple memory pages) is often quicker however it also requires additional memory for the additional data that is being loaded.

There is no single data loading and unloading technique (e.g., page or full load) that is best for all of the data needs of a particular database system. Because for the same data, the better or more resource efficient technique may vary over time and may depend on data changes and usage. Described herein are systems, methods and example embodiments that enable data to be stored and loaded using either the paging technique or a full load technique, particularly with regard to column-oriented, in-memory databases. This hybrid load functionality allows a particular database system to switch between the various data load techniques or approaches for an in-memory columnar database. Data from the same column may be loaded using either full load or page load techniques, and the database system may switch which technique is used for the column data over time.

Figure 1:
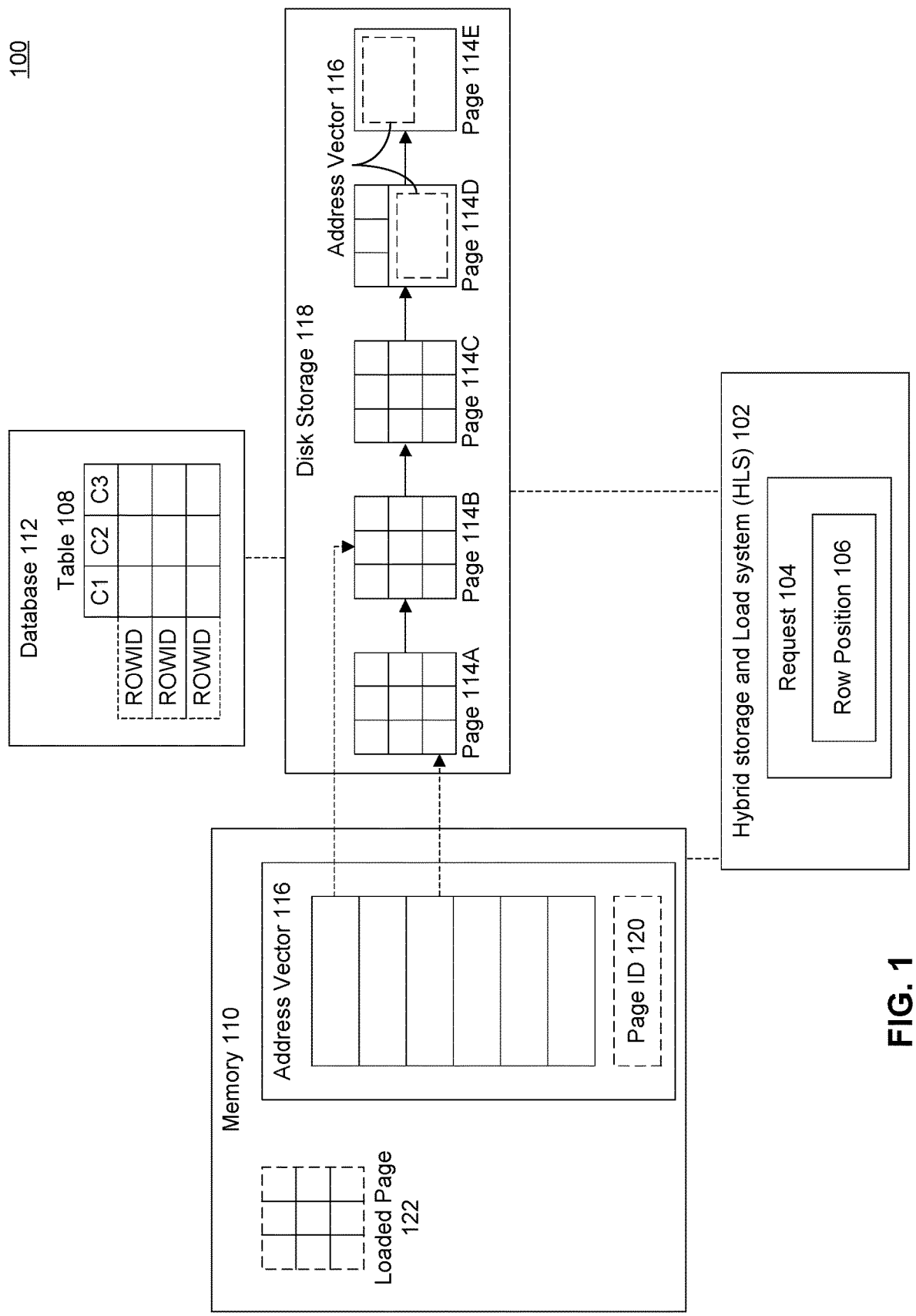
FIG. 1 is a block diagram illustrating example functionality for providing a hybrid storage and load system, according to some embodiments.

FIG. 1 is a block diagram 100 illustrating example functionality for providing a hybrid storage and load system (HLS) 102, according to some embodiments. HLS 102 may enable both full load and page load techniques to be utilized in a column-oriented database 112. HLS 102, in doing so, may provide more efficient access to data (e.g., in loading and unloading data) and query processing.

HLS 102 may improve system resource utilization rates, reduce resource consumption, and increase system throughput by saving unnecessary computing cycles, memory, bandwidth and other resources from being wasted with more inefficient memory utilization and data access techniques. This may result in improved productivity, and may allow organizations to save money and/or increase profitability.

In an embodiment, HLS 102 may receive a query or other access request 104 to access data of a database 112. Request 104 may include an indication of one or more values to be searched for on database 112, and for which some information is to be returned. For example, in an embodiment, request 104 may include a row position value 106. The request 104 may be a request for a corresponding ROWID value from the database 112 that corresponds to the provided row position 106.

ROWID may be a database or system assigned identifier used to uniquely identify or distinguish between each of the rows of a database 112. In an embodiment, each row of data in a database 112 (across the various tables 108) may have its own unique ROWID that is automatically assigned to it for the lifetime of the row (e.g., until the row is deleted and/or garbage collected from the database). In an embodiment, ROWID may be a 64-bit integer. ROWIDs in a particular table 108 are generally increasing, however due to various data reorganization operations, the order of ROWIDs in a database or table can change.

As described above, through HLS 102, database 112 may combine columnar storage with hybrid data load capabilities (e.g., in which both page and full load capabilities are accessible for loading data from disk storage 118 to memory 110, and back out of memory 110). Some frequently accessed data (e.g., hot data) may be stored in memory to avoid frequent or repeated read-and-writes of the same data over and over again from disk storage 118 to memory 110. However, it is too expensive to store and maintain large volumes of database 112 in memory 110. As such, some of the majority of the data of database 112 may be maintained in disk storage 118 and loaded into and out of memory 110 as needed. HLS 102 provides a unified storage format that allows database 112 to use either page or full load techniques to access the columnar data of database 112 stored in disk storage 118.

This hybrid data load approach, allows for greater flexibility and memory utilization, particularly in those cases when only a small portion of data from a column needs to be accessed, relative to all of the data of the column that may be stored or available. In a paged implementation, the full column data does not need to be loaded into memory. Only those data or memory pages containing the value(s) being accessed need to be loaded into memory.

Database 112 may be a column-oriented database, with multiple tables (only one example table 108 is illustrated), from which columns of data (spanning multiple rows) may be loaded from a disk storage location 118 into and out of memory 110. HLS 102 may then perform query or other data processing on the memory-loaded data page(s) (e.g., loaded page 122).

Table 108 illustrates an example logical representation of the data (e.g., dictionary value IDs) of a table 108 of database 112. As illustrated, the table 108 may include a number of columns, although for simplicity's sake only three columns designated as C1, C2, and C3 are illustrated. Each column may include its own data stored across various rows.

In an embodiment, the column data or values of database 112 may be dictionary compressed where a data dictionary maps each unique value present in database 112 (or a particular table 108) for the column data to a unique integer called a value ID. The data may then be stored as a vector of such value IDs. Table 108 may be populated with various value IDs that may be mapped to actual values using the dictionary (not illustrated). The row or position in the vector (of the dictionary) may represent the dictionary-mapped value for the data in that row position of the column.

However, since each ROWID value, for each row of database 112, is by definition unique, there is no separate dictionary for ROWID values. As such, ROWID values, may be stored in memory blocks across memory pages 114A-E. These pages 114 (which is a term used to refer to all or any combination or subset of the enumerated pages 114A-E) are then loaded into and out of memory 110 when using a page-load technique. With full- or column load, an entire column of data, which may span multiple pages 114 may be loaded into memory 110 for processing.

In an embodiment, a database 112 or other system may assign a row identifier (ROWID) to each row of the database 112. While only one table 108 with three rows is illustrated, it is understood that a database 112 may include multiple tables, each with multiple rows. Then, for example, each row of every table would have its own unique ROWID. In an embodiment, ROWIDs may be unique within the context of the rows of a table 108, while in anther embodiment, ROWIDs may be globally unique across multiple or all the tables 108 of a database 112.

The ROWIDs of database 112 may be stored across a plurality of memory blocks across various data or memory pages 114A-E. Each page 114 may include multiple memory blocks. For example, as illustrated, page 114A includes nine memory blocks. While pages 114B and 114C both also include nine memory blocks, in other embodiments, the number of memory blocks stored on each page 114 may vary depending on the size of the memory pages and the blocks.

The memory blocks, which may store compressed data stored in a byte compatible format, may be paginated and each block may be stored completely on a single memory page 114. The pages 114A-E may be linked together to form a page chain 114A-E, as illustrated by the arrows between the pages 114A-E.

In an embodiment, ROWID may be stored as a table column or attribute that is inaccessible or invisible to users or other systems accessing data of database 112. ROWID may be used by database 112 and HLS 102 for internal tracking and record or data storage, access, and/or retrieval. In an embodiment, the ROWID column may conventionally be stored in a compressed form in a flat file, in a serialized format. Then, when a ROWID value for any row needs to be accessed, the complete compressed column would then be loaded in memory and the required value is accessed.

However, loading the entire ROWID compressed file may waste a system resources, particularly if only a small subsection of the column data or rows are actually being accessed, and thus only a small subsection of ROWID values are necessary. HLS 102 addresses this issue by paginating ROWID values across pages 114A-E, which enables partial or page loads of ROWID values with the page loading data functionality.

When storing ROWID values in disk storage 118, HLS 102 may divide the data (the actual ROWID values themselves) into fixed-size blocks containing any number of consecutive values or ROWIDs. In an embodiment, a block may contain 1024 values. These are the memory blocks illustrated within each page 114. Each block or memory block may implement the most efficient compression method available for that block. In an embodiment, how much a block may be compressed may depend on the actual ROWID values being stored (e.g., such as the sequential or non-sequential nature of the values of the ROWIDs and/or compression technique being used). If the ROWID values are generally sequential, differing by only a small number of characters, then greater compression may be enabled for the block. As such, each memory block may be of variable size and may be individually allocated.

In an embodiment, HLS 102 may generate an address vector 116 for the pages 114. In an embodiment, address vector 116 may include an array of pointers for these memory blocks (as stored on the various data pages 114). In an embodiment, each pointer may point to an index for a particular memory block. Then, for example, locating a particular block pointer for a given row position 106, in address vector 116, may simply be the row position value divided by 1024. The address vector 116 illustrated shows only a subset of pointers that may be stored. In an embodiment, the address vector 116 may also store, include, or maintain metadata about the structure and/or values store on each page 114A-E. For example, address vector 116 may store a value of the smallest ROWID or column value stored on a particular page 114. In an embodiment, this information (such as smallest ROWID) may be moved into or stored in its own structure for paged implementation of ROWID.

While generated and stored on disk storage 118, during query or request 104 processing, address vector 116 may be copied and loaded into (and maintained in) memory 110 for an extended period of time or while processing multiple requests 104, as illustrated. Address vector 116 in memory 110 may be a copy of the address vector 116 in disk storage 118 Copying and maintaining address vector 116 in memory 110 (rather than loading and unloading or evicting it from memory 110) may save system resources that would otherwise be consumed with frequent read/write accesses between disk storage 118 and memory 110 for the loading and unloading of address vector 116.

Because the size of the address vector 116 is small, it can be maintained in memory over multiple transactions, queries, or requests 104 and used to quickly identify which page 114 to load for a given row position or ROWID. For example, in an embodiment, address vector 116 may consume 8 bytes for every 1024 rows, and may reference up to two billion rows or RID values. This may also enable quick lookup over page sorted ROWIDs so that the number of accesses to the pages 114 are minimized and resources further conserved. For example, request 104 may include a value 106 such as ROWID value. Then, for example, using address vector 116 from memory 110, HLS 102 may quickly identify which page(s) 114 to retrieve that includes the identified ROWID(s).

On a load operation, vector objects (from address vector 116) may directly point to a storage location or address of a page 114, or may otherwise logically point to a page 114. In an embodiment, on a load of a particular memory block, an in-memory block structure may be created that point directly on the loaded page (e.g., 122). This use of pointers in address vector 116 reduces the memory footprint and speeds up queries as memory copy is not required and enables memory blocks to be quickly located. In an embodiment, the logical pointers from address vector 116 may be used to identify both the page 114 and the offset of a memory block within the page 114.

To scan for a row position 106, HLS 102 may reference address vector 116 to identify a page ID 120. Page ID 120 may be a handle, pointer, or address to the page 114A-E containing the corresponding memory block where the row position 106 is located. HLS 102 may first check to see if the page 114A-E corresponding to page ID 120 is already loaded in memory 110. If the corresponding page 114 has not been previously loaded in memory 110, HLS 120 may load the page 114A-E from disk storage 118 into memory 110.

Using the logical or address pointer, HLS 102 may then identify the offset within the loaded page 122 to identify the memory block of the page 114 containing the row position 106 and/or corresponding ROWID value. As noted above, in an embodiment, the position within the memory block may be row position 106 divided by 1024.

For page loading of column data, a particular page 114 of column data may be loaded from disk storage 118 to memory 110 rather than loading all of the data of the column. For example, if table 108 includes 1000 rows of data, and each page includes 100 row values, then partial or page load may enable as few as 100 rows of data to be transferred from disk storage 118 to memory 110 for query processing. HLS 102 as described herein, enables the corresponding 100 ROWIDs for that page to be loaded into memory 110, rather than requiring all 1000 ROWIDs to be transferred from disk storage 118 to memory 110, which would consume large amounts of bandwidth in the transferring and large chunks of memory in storage), HLS 102 may enable a subsection or page of corresponding or relevant ROWIDs to be transferred to be used in processing. This also saves processing resources when the data is unloaded from memory 110 as less data is removed, evicted, or garbage collected.

Figure 2:
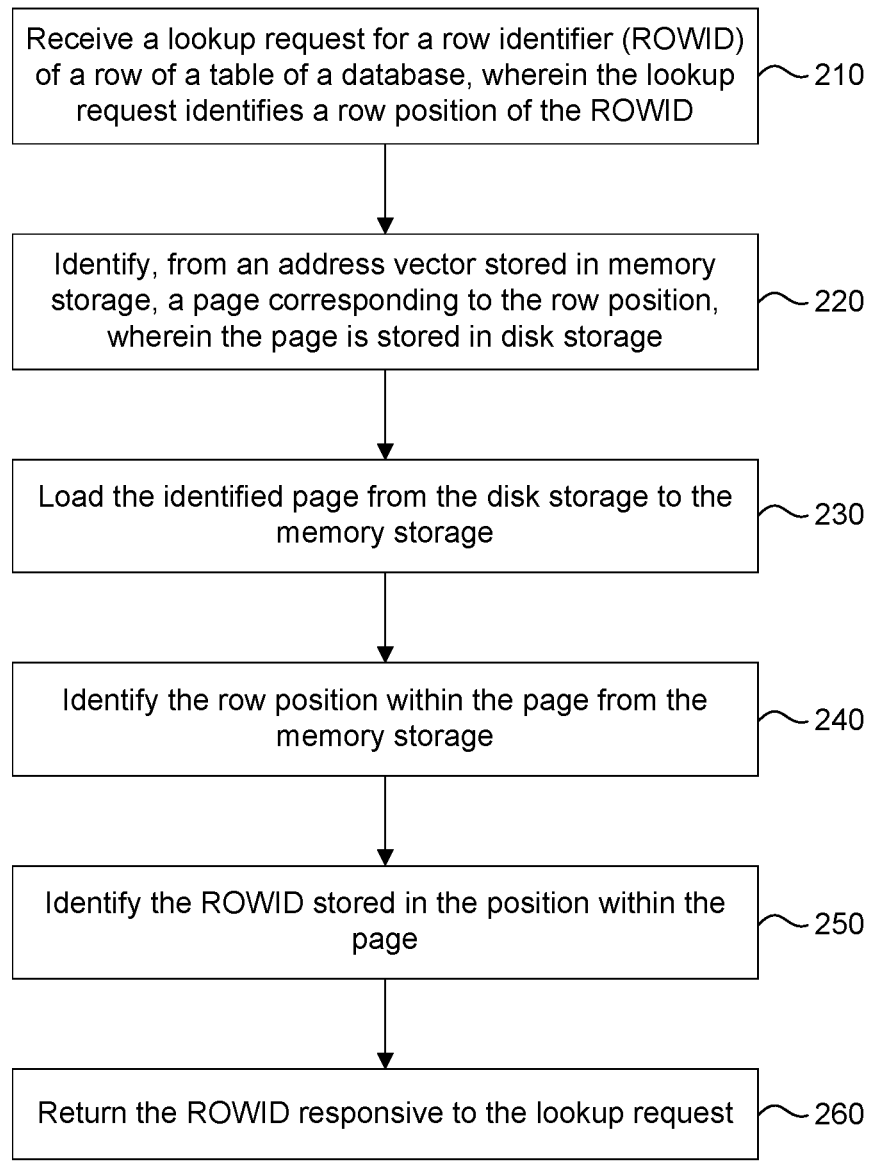
FIG. 2 is a flowchart illustrating example operations for providing a hybrid storage and load system, according to some embodiments.

FIG. 2 is a flowchart 200 illustrating example operations for a providing a hybrid storage and load system (HLS), according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 210, a lookup request for a row identifier (ROWID) of a row of a table of a database is received, wherein the lookup request identifies a row position of the ROWID. For example, HLS 102 may receive a request 104. Request 104 may include a value of a row position 106 for which a corresponding ROWID is requested. In an embodiment, row position 106 may indicate a particular table, column, and row of a database 112 for which the corresponding ROWID is requested. In an embodiment, request 104 may be associated with processing a query that has been received and which is to be executed against database 112.

In 220, a page corresponding to the row position is identified from an address vector stored in memory storage, wherein the page is stored in disk storage. For example, address vector 116 may have been copied from pages 114C and 114D may be stored in memory prior to receiving request 104. From address vector 116 (as maintained in memory 110), HLS 102 may identify a page ID 120 corresponding to row position 106.

For example, address vector 116 may include metadata about the minimum, maximum ROWID values or row positions stored on each page 114A-E. Using this metadata, HLS 102 may identify which page 114A-E corresponds to the row position 106 corresponding to lookup request 104. Page ID 120 may be a label, pointer, or address to one of the memory pages 114A-E that includes a memory block where the identified row position 106 is stored.

In 230, the identified page is loaded from the disk storage into the memory storage. For example, HLS 102 may retrieve the identified page 114A-E, corresponding to page ID 120, from disk storage 118 into memory 110. This page-based loading of ROWIDs may save processing and memory resources that would otherwise be required of all of the ROWIDs of a particular column (from a flat file) were loaded into memory 110. Rather than loading all of the ROWIDs, HLS 102 may perform a page or partial load only a single or subset of one or more memory pages 114A-E.

In 240, the position within the page is identified from the memory storage. For example, HLS 102 may have loaded the page 114A-E corresponding to page ID 120 into memory 110 as loaded page 122. From loaded page 122, HLS 102 may identify a memory block that includes the requested row position 106. In an embodiment, this may be determined by dividing the row position 106 by 1024 (e.g., the number of values in each memory block).

In 250, the ROWID stored in the row position within the page is identified. For example, HLS 102 after identifying the offset within the memory block, may decompress (if necessary) the ROWID value and identify the ROWID for the row position 106 from the loaded page 122.

In 260, the ROWID is returned responsive to the lookup request. For example, HLS 102 may return the identified ROWID value to a requesting user or system (e.g., that submitted lookup request 104).

Figure 3:
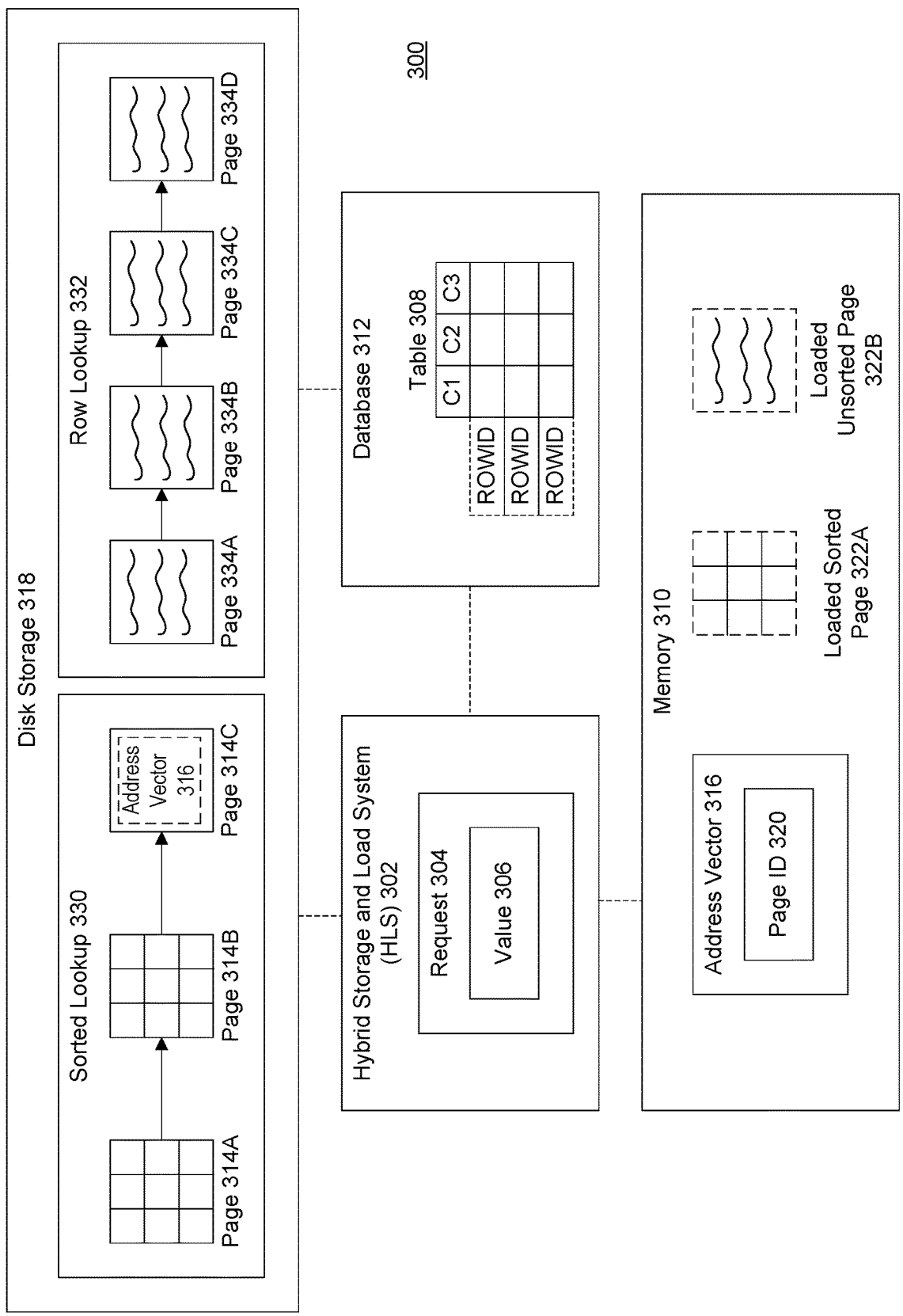
FIG. 3 is a block diagram illustrating example functionality for providing a hybrid storage and load system, according to some embodiments.

FIG. 3 is a block diagram 300 illustrating example functionality for providing a hybrid storage and load system (HLS) 302, according to some embodiments. As described herein, numbered elements of FIG. 3 may include features described above with regard to similarly numbered elements of FIG. 1. For example, HLS 302 and database 312 may include or incorporate features described above with respect to HLS 102 and database 112, respectively, and vice versa.

In an embodiment, sorted lookup 330 and column lookup 332 may be part of a reverse index that may be used by HLS 302 to respond to requests 304. For example, HLS 302 may perform value 306 to row position or ROWID lookups using the reverse index (e.g., sorted lookup 330 and row lookup 332).

As noted above, the order of ROWIDs in a particular table 308 may be random, unordered, or unsorted (due to data changes, usage, etc.). As such, trying to scan an entire column of ROWIDs for a particular value would be time and resource consuming, especially as the number of rows in a database 312 or table 308 grow into the hundreds of thousands, millions, or even billions.

As such, HLS 302 may sort the ROWIDS from the original database 312 and store them across various memory blocks across various memory pages 314A-C in a sorted lookup 330. HLS 302 may also generate an address vector 316 for the pages 314A-B where memory blocks are stored, which may be appended after the last memory block or stored at the end of the page chain. This address vector 316 may also include pointers to pages 314A-B and blocks within those pages.

Because of random or unsorted nature would make ROWID lookups resource intensive, the reverse index for existing in-memory ROWIDs may include a sorted set of ROWIDs stored in a compressed form in memory blocks across multiple pages 314A-C as sorted lookup 330. HLS 302 may generate an index or address vector 316 for the pages 314A-B of stored lookup 330. In an embodiment, the paging of the sorted ROWIDs into memory blocks and across pages 314A-C may be similar to that described above with respect to the unsorted ROWIDs as they are stored across the memory blocks of pages 114A-E.

In an embodiment, the pages 314A-314C may be index pages forming an index page chain. The index or address vector 316 may allow for the corresponding index page 314A-C of sorted lookup 330 to be loaded into memory 310. The sorted ROWID values may be compressed into memory blocks across pages 314A-C.

To more quickly identify the block that contains a particular ROWID value 306, HLS 302 may generate or create a page search helper during or after the reverse index creation. The page search helper may include the minimum ROWID value stored in each page (since the ROWIDs of index pages 314A-C are stored in sorted order).

HLS 302 may then quickly identify the page 314A-C that contains the memory block with the requested ROWID using the helper or metadata. After the corresponding page 314A-C is identified, HLS 302 may load that page into memory as loaded sorted page 322A. In an embodiment, HLS 302 may perform a binary search on the memory blocks of the loaded sorted page 322A because the ROWID is guaranteed to exist on one of the memory blocks of that page 322A. This ensures that only one page 314A-C is read from disk storage 318 to perform this lookup, rather than loading and performing a binary search for all of the index pages 314A-C which would require extra system resources and memory space 310.

Similar to what was described above for address vector 116, address vector 316 may be copied and maintained in memory 310 and accessed by HLS 302 to identify the page ID 320 of the corresponding page 314A-C to load into memory.

HLS 302 may perform a binary search on sorted lookup 330 to identify and load a page 322A (corresponding to page ID 320) and memory block where the ROWID value is stored in sorted order. Then, for example, using row lookup 332, HLS 302 may identify the corresponding row position (e.g., in the original unsorted list of ROWIDs). In an embodiment, row lookup 332 may be a simple array structure.

If a user wants to perform multiple lookups (e.g., of multiple ROWIDs), it is possible that multiple ROWIDs fall on the same page 334A-D in the sorted ROWIDs. If the lookup is performed for each row in the given order, a same page 334 may be accessed multiple times. To avoid this, HLS 302 may perform a sorted lookup by sorting the input ROWIDs. HLS 302 may then perform a lookup on the sorted input ROWIDs and maintaining a page handle or page IDs 320 so that consecutive accesses would be on the same loaded sorted page 322A. This may ensure that each page 334 is only loaded once. In an embodiment, the ROWIDs stored on an index page 314 may already be sorted.

Figure 4:
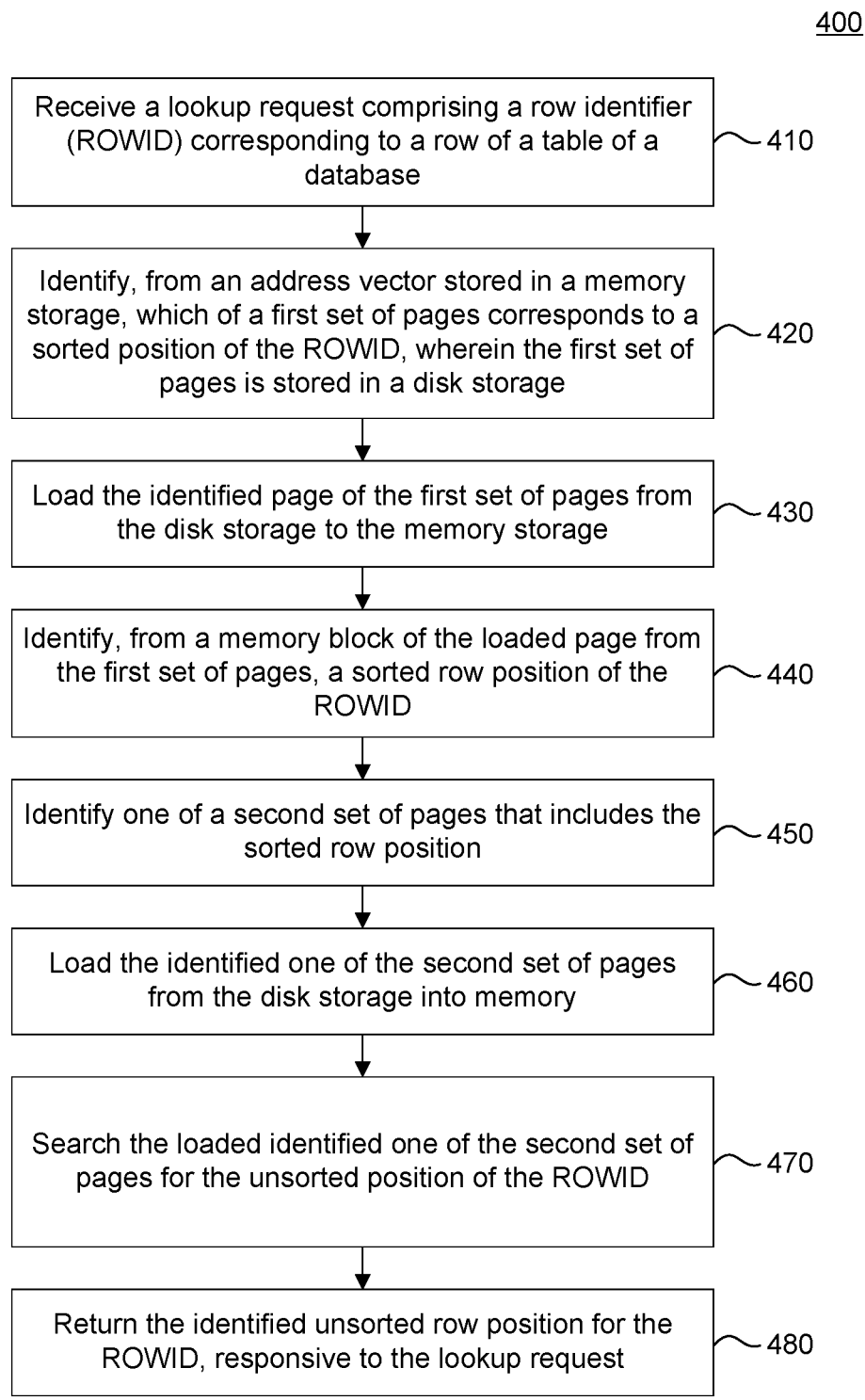
FIG. 4 is a flowchart illustrating example operations for providing a hybrid storage and load system, according to some embodiments.

FIG. 4 is a flowchart 400 illustrating example operations for providing a hybrid storage and load system (HLS), according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3.

In 410, a lookup request including a row identifier (ROWID) corresponding to a row of a table of a database is received. For example, HLS 302 may receive a lookup request 304 including a lookup value 306. Lookup value 306 may be a value of a particular ROWID of a particular row in table 308 of database 312. The ROWIDs of database 312 however may be unsorted and doing a binary search on all the ROWID values may waste unnecessary resources. As such, HLS 302 may use a reverse index to identify a row position of the provided ROWID value 306.

In 420, which of a first set of pages corresponds to a sorted position of the ROWID is identified from an address vector stored in a memory storage, wherein the first set of pages is stored in a disk storage. For example, HLS 302 may sort or order the ROWIDs of database 312 and store them in memory blocks across pages 314A-C. While only three ROWIDs are illustrated for simplicity sake, in other embodiments, a table may include millions or billions of ROWIDs. A sorted lookup 330 may include various index pages 314A-C that include a sorted or ordered ROWIDs stored in memory blocks.

HLS 302 may also generate an index or address vector 316 for the index pages 314A, 314C. The address vector 316 may simplify identifying which page 314A-C contains the memory block with the requested ROWID value 306. In an embodiment, address vector 316 may include metadata about which ROWIDs values (min or max) are stored on each page 314A-C. As illustrated, a copy of address vector 316 may be loaded into and maintained in memory 310 as address vector 316. From address vector 316, HLS may obtain a page handle or page ID 320 for a corresponding page 314-C including the value 306 in a sorted order.

In 430, the identified page of the first set of pages is loaded from the disk storage to the memory storage. For example, HLS 302 may retrieve the index page 314A-C that corresponds to the page ID 320 from disk storage 318 into memory 310 as loaded sorted page 322A.

In 440, a sorted row position of the ROWID is identified from a memory block of the loaded page from the first set of pages. For example, HLS 302 may identify from the loaded sorted page 322A a sorted row position of the ROWID value 306.

In 450, one of a second set of pages that includes the sorted row position is identified. For example, HLS 302 may identify which of the pages 334A-D of row lookup 332 include the sorted row position value determined from the loaded sorted page 322A.

In 460, loading the identified one of the second set of pages from the disk storage into memory. For example, HLS 302 may load one of the pages 334A-D, that includes the sorted row position value corresponding to the requested ROWID value 306, from disk storage 318 into memory 310 as loaded unsorted page 322B.

In 470, the loaded identified one of the second set of pages is searched for the unsorted position of the ROWID. For example, HLS 302 may perform a binary search on the loaded unsorted page 322B to identify the original or unsorted row position of the requested ROWID value 306 in the original database 312 or table 308.

In 480, the identified unsorted row position for the ROWID is returned responsive to the lookup request. For example, HLS 302 may return the identified original or unsorted row position from loaded unsorted page 322B to a requesting user or system.

Figure 5:
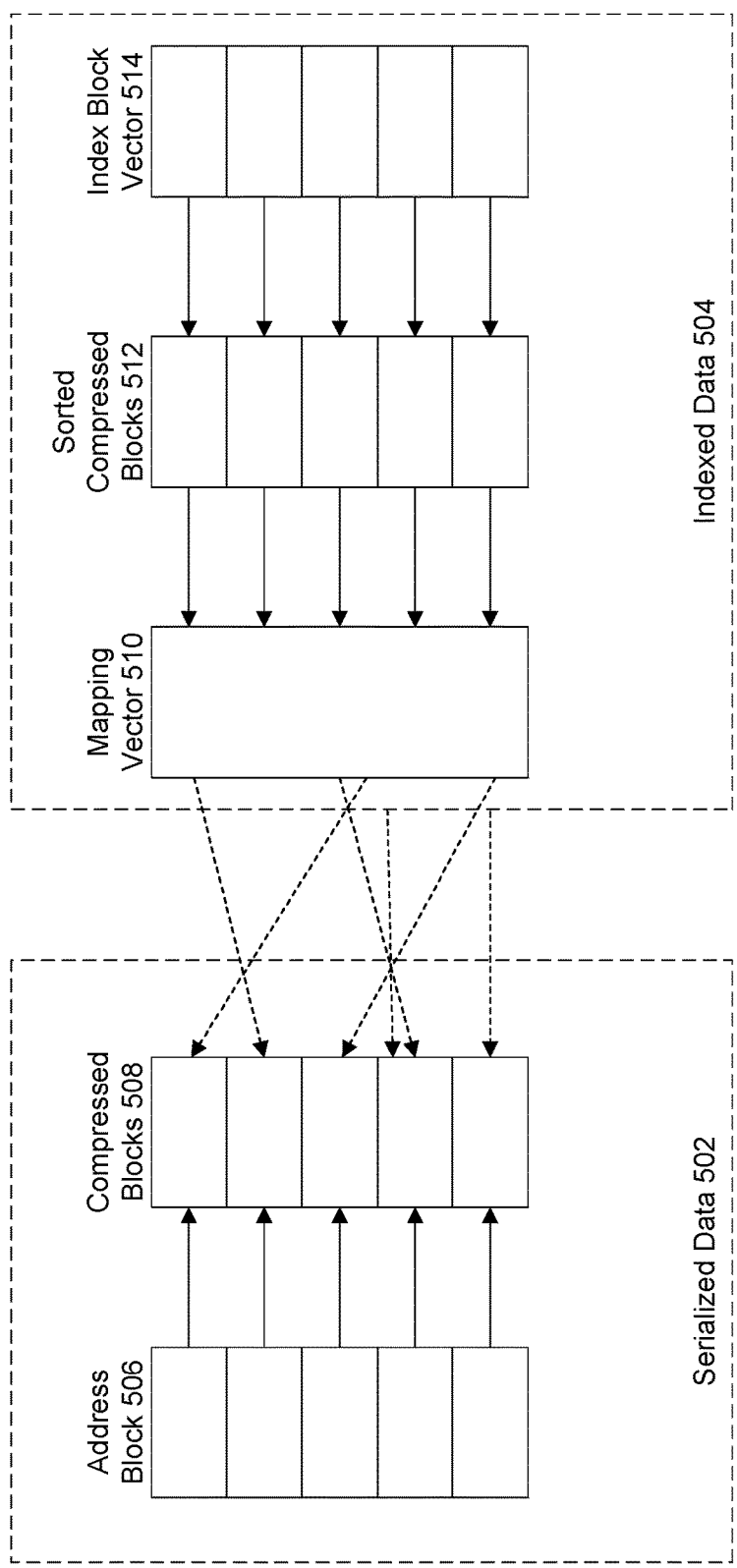
FIG. 5 is a block diagram illustrating an example hybrid data storage and load system, according to some embodiments.

FIG. 5 is a block diagram 500 illustrating an example hybrid data storage and load system, according to some embodiments. The example storage system illustrated in FIG. 5 represents one example embodiment of how ROWIDs may be stored to enable both full load and page load access to ROWID and database values.

The serialized data 502 may correspond to the storage and retrieval of data described above with respect to FIG. 1 and HLS 102. For example, compressed blocks 508 may correspond to the unsorted ROWID data stored in the memory blocks across pages 114A-E. The address vector 506 may correspond to the address vector 116 stored at the end of the page chain, that is loaded into and accessed from memory 110.

The indexed data 504 may correspond to the storage and retrieval of data described above with respect to FIG. 3 and HLS 302. For example, index vector 514 may correspond to address vector 316 and may include pointers to the sorted compressed blocks 512 that may correspond to the memory blocks across index pages 314A-C. Mapping vector 510 may be used to translate the sorted row position obtained from the sorted compressed blocks 512 to the original or unsorted row position in the RIDS of a table from a database.

Figure 6:
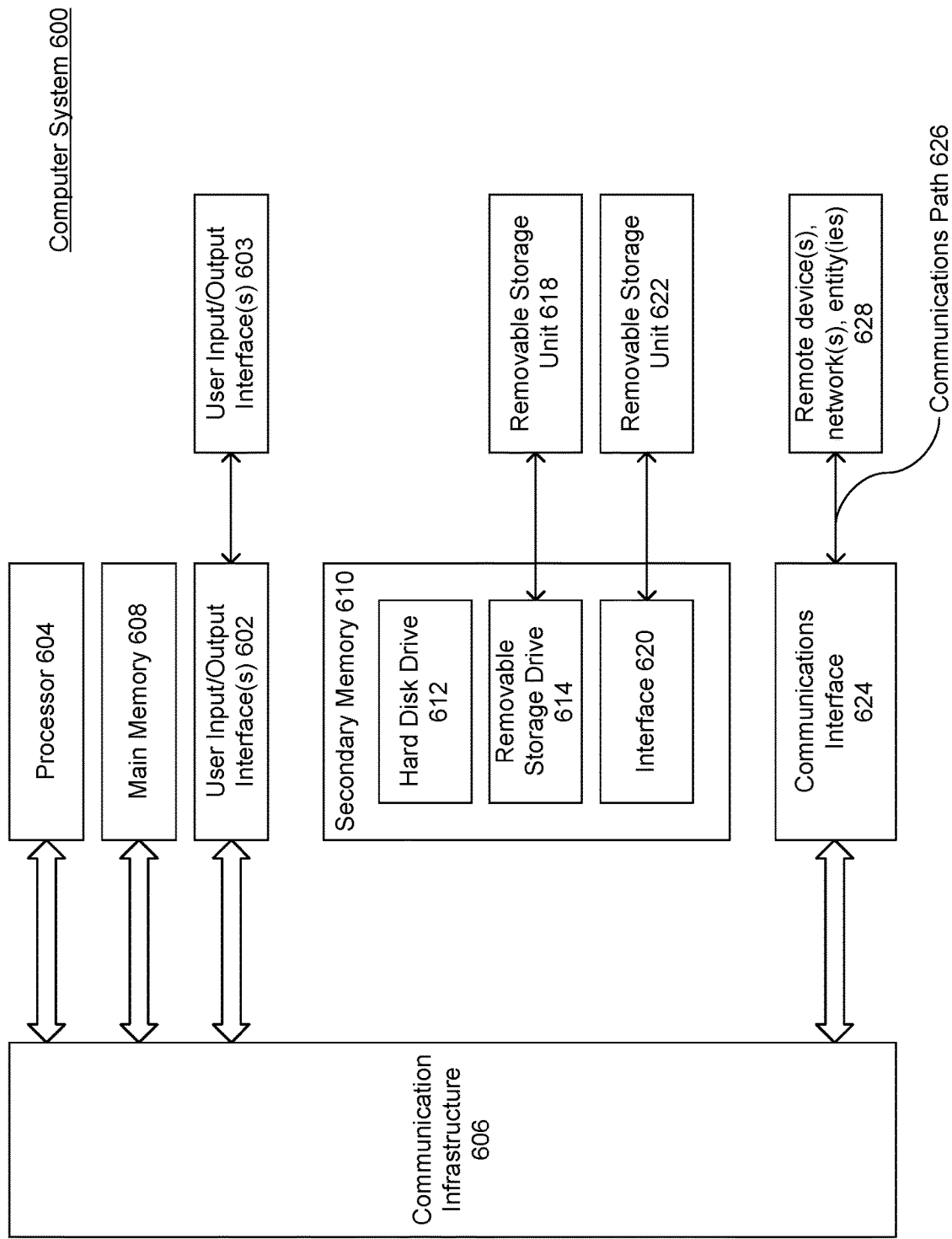
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
receiving a lookup request comprising a plurality of row identifiers (ROWIDs), each ROWID corresponding to a row of a table of a database;
sorting the plurality of ROWIDs of the received lookup request;
identifying, from an address vector stored in a memory storage, which of a first set of pages corresponds to a sorted position of a first ROWID, wherein the first set of pages is stored in a disk storage;
determining that the identified page corresponds to a sorted position of a second ROWID;
loading the identified page of the first set of pages from the disk storage to the memory storage;
identifying, from a memory block of the loaded page from the first set of pages, a sorted row position of both the first ROWID and the second ROWID;
identifying one of a second set of pages that includes the sorted row position of the first ROWID, loading the identified one of the second set of pages from the disk storage into memory;
searching the loaded identified one of the second set of pages for an unsorted position of the first ROWID; and
returning the identified unsorted row position for the first ROWID, responsive to the lookup request.

2. The method of claim 1, wherein the first set of pages comprise a set of ex pages that include ROWIDs of the database stored in a sorted order.

3. The method of claim 2, wherein the ROWIDs are stored in a compressed format across a plurality of memory blocks.

4. The method of claim 2, wherein the address vector comprises an index vector.

5. The method of claim 4, wherein the index vector includes metadata indicating a minimum ROWID stored on each index page.

6. The method of claim 1, wherein the second set of pages comprise a set of memory pages includes ROWIDs of the database stored in an unsorted order.

7. The method of claim 1, wherein the searching comprises performing a binary search.

8. The method of claim 1, wherein the ROWID is inaccessible to queries from a user.

9. The method of claim 8, wherein a unique ROWID uniquely identifies each row of each table of the database.

10. The method of claim 1, further comprising:
maintaining a page handle corresponding to the loaded page for both the first ROWID and the second ROWID.

11. A system comprising
a memory; and
at least one processor coupled to the memory and configured to perform operations comprising:
receiving a lookup request comprising a plurality of row identifiers (ROWIDs), each ROWID corresponding to a row of a table of a database;
sorting the plurality of ROWIDs of the received lookup request;
identifying, from an address vector stored in a memory storage, which of a first set of pages corresponds to a sorted position of a first ROWID, wherein the first set of pages is stored in a disk storage;
determining that the identified page corresponds to a sorted position of a second ROWID;
loading the identified page of the first set of pages from the disk storage to the memory storage;
identifying, from a memory block of the loaded page from the first set of pages, a sorted row position of both the first ROWID and the second ROWID;
identifying one of a second set of pages that includes the sorted row position of the first ROWID;
loading the identified one of the second set of pages from the disk storage into memory;
searching the loaded identified one of the second set of pages for an unsorted position of the first ROWID; and
returning the identified unsorted row position for the first ROWID, responsive to the lookup request.

12. The system of claim 11, wherein the first set of pages comprise a set of index pages that include ROWIDs of the database stored in a sorted order.

13. The system of claim 12, wherein the ROWIDs are stored in a compressed format across a plurality of memory blocks.

14. The system of claim 12, wherein the address vector comprises an index vector.

15. The system of claim 14, wherein the index vector includes metadata indicating a minimum ROWID stored on each index page.

16. The system of claim 11, wherein the second set of pages comprise a set of memory pages including ROWIDs of the database stored in an unsorted order.

17. The system of claim 11, wherein the searching comprises performing a binary search.

18. The system of claim 11, wherein the ROWID is inaccessible to queries from a user, and wherein a unique ROWID uniquely identifies each row of each table of the database.

19. A non-transitory computer-readable device having instructions stored thereon that, when executed by at least one computing device, cause the at least one computing device to perform operations comprising:
receiving a lookup request comprising a plurality of row identifiers (ROWIDs), each ROWID corresponding to a row of a table of a database;
sorting the plurality of ROWIDs of the received lookup request;
identifying, from an address vector stored in a memory storage, which of a first set of pages corresponds to a sorted position of a first ROW wherein the first set of pages is stored in a disk storage;
determining that the identified page corresponds to a sorted position of a second ROWID;
loading the identified page of the first set of pages from the disk storage to the memory storage;
identifying, from a memory block of the loaded page from the first set of pages, a sorted row position of both the first ROWID and the second ROWID;
identifying one of a second set of pages that includes the sorted row position of the first ROWID:
loading the identified one of the second set of pages from the disk storage into memory,
searching the loaded identified one of the second set of pages for an unsorted position of the first ROWID; and
returning the identified unsorted row position for the first ROWID, responsive to the lookup request.

20. The device of claim 19, wherein the first set of pages comprise a set of index pages that include ROWIDs of the database stored in a sorted order.

* * * * *